UNITED STATES PATENT OFFICE 2,337,018

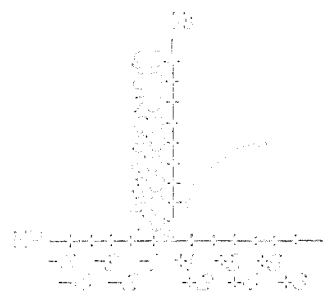
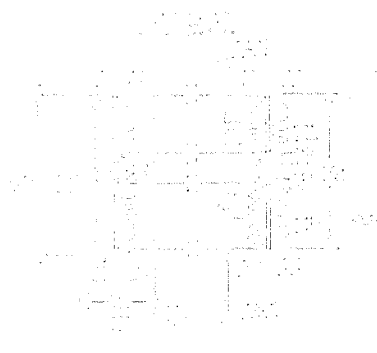
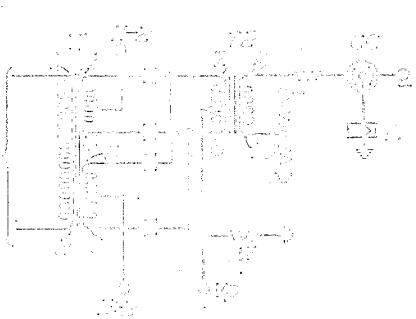
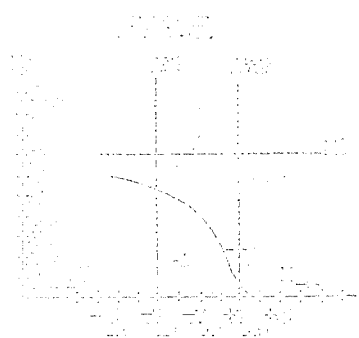
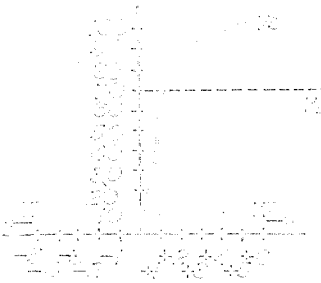

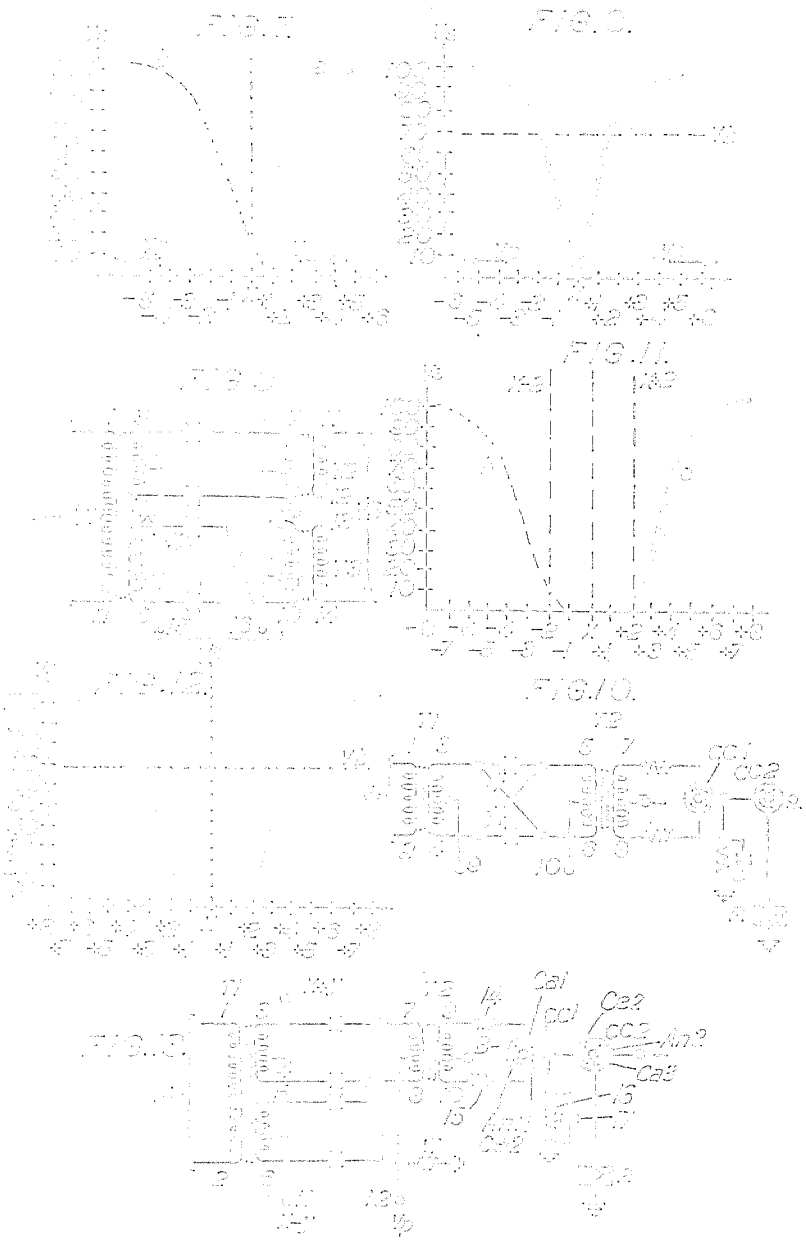

DEVICE FOR INDICATING ELECTRIC POTENTIALS

Marinus den Hertog, Antwerp, Belgium, assignor to International Standard Electric Corporation, New York, N. Y., a corporation of Delaware Application August 5, 1947, Serial No. 766,018
In the Netherlands December 12, 1946

Section 1, Public Law 690, August 8, 1946
Patent expires December 12, 1966

4 Claims. (Cl. 240—172)

The invention relates to a device for indicating electric potentials, particularly for use in telecommunications systems or other signalling systems. More particularly, the invention relates to a device comprising a static switch and one or more gaseous discharge tubes, in which the static switch permits an electric potential of direct current to control the connection of a potential of alternating current to the control electrode of a gaseous discharge tube.

The object of this invention is to provide a circuit arrangement by which the operation of a gaseous discharge tube, and of a signal receiving device which is connected in series with the discharge space thereof, is controlled by means of a direct current potential of one particular value or by any potential within a predetermined band of potentials only, with the exclusion of all other potentials of either higher or lower value.

A somewhat similar arrangement is described in the copending U. S. application Serial No. 765,022 which was filed on July 31, 1947. However, the circuit arrangement described therein only permits triggering of the cold cathode tube by means of an electric potential having either a higher or lower value than a predetermined critical potential.

In many cases it is very useful that the arrangement is such as will function on one particular predetermined potential or on a predetermined range of potentials exclusively.

According to the invention, this is rendered possible by providing two separate paths for the controlling potential through one or a combination of two static switches, which paths concurrently control the connection of alternating current potentials to a system of one or more gaseous discharge tubes, in such a manner, that one of these paths controls the connection of an alternate current potential to the control gap of a discharge tube, when the controlling potential is higher and the other path exercises this function when this controlling potential is lower, than a potential of predetermined value, or than a predetermined range of potentials at which the arrangement should function.

According to another feature of the invention the alternating current potentials resulting from the action of each path for the controlling potential are added, and conditions are so established that only when the sum of these potentials exceeds a predetermined limiting value is the gaseous discharge tube caused to function.

According to yet another feature of the invention, the alternating current potential resulting from the action of each path for the controlling potential are subtracted from one another, and the system of gaseous discharge tubes is caused to function only when the remaining potential drops below a predetermined limiting value.

The above-mentioned and other features and objects of this invention and the manner of attaining them will become more apparent and the invention itself will be best understood, by reference to the following description of embodiments of the invention taken in conjunction with the accompanying drawings, wherein:

Figure 1 shows the basic static switch as utilized in the present invention;

Figure 2 shows a response curve obtained with the switch of Figure 1;

Figures 3 and 4 show circuit arrangements for carrying out the present invention;

Figure 5 shows the response curve obtainable with the circuits of Figures 3 and 4;

Figure 6 shows another response curve for a static switch as in Figure 1;

Figures 9, 10 and 13 are further circuits in accordance with the present invention; and Figures 7, 8, 11 and 12 are response curves for the circuits of Figures 9, 10 and 13.

Considering Figs. 1 and 2, there is shown a static switch and the response curve of this switch which is of a known type. A full understanding of the operation of this switch may be had from a consideration of "Annales des Postes Télégraphes et Téléphones," 1937, page 775, and from the copending U. S. application of L. Cases, Serial No. 765,022, which was filed on July 31, 1947. As can best be seen by Fig. 1, the static switch is in effect a potential comparing device since it compares a reference potential applied between points 1 and 2, with a potential applied at point M, the arrangement being such that the potential applied at M bucks or counteracts that applied between 1 and 2. The point M represents a point in an electrical circuit which is subject to variation of potential. When the potential applied at M is of such a polarity and magnitude as to reverse the potential applied between 1 and 2, the so called static switch becomes conductive and passes an alternating current from the A. C. source which does not vary for the different magnitudes of reference potential and the potential to be detected. The device comprising transformers $T_1$, $T_2$ and rectifiers $Re_1$ and $Re_2$, therefore, acts as a switch for controlling the passage of A. C. and since it comprises no moving contacts or parts, it is commonly known in the telecommunication art as a static switch.

In the curve of Figure 2 there is shown the relation between the value of direct current potential Vp as applied at points 1 and 2 to the D. C. path, and the potential Vs obtained in the secondary winding of the transformer T₂ of Fig. 1. As is readily apparent when point 1 is negative with respect to point 2, no A. C. will be passed except for those potentials less than 0.5 v. When points 1 and 2 are at equal potentials the value of Vs is approximately 8 v. When point 1 is 2 v. positive with respect to point 2, the potential Vs obtained is 42 v.

Fig. 3 shows a combination of two static switches, each of which has the same characteristics as that illustrated by Fig. 2. They have a common feeding transformer T₁, of which the two secondary windings 3—4 and 5—6 respectively are each equivalent to the secondary winding of transformer T₁ in Fig. 1. The secondary windings 11—12 and 13—14 of output transformers T₂ and T₃ are connected in series in such a manner that the alternating potentials induced in these two windings are aiding.

For the purpose of using this arrangement for detecting the presence of one particular potential, e. g. a potential for X volts, the electric midpoints of windings 3—4 and 5—6 are connected together and to the source of electric potential Vp which has to be detected. The electric midpoint of winding 7—8 is connected to a potential which is e. g., 2 v. negative with respect to and the electric midpoint of winding 9—10 is connected to an electric potential which is e. g. 2 v. positive with respect to the potential X. The effect of this arrangement is illustrated in Fig. 5. In this figure, curve a represents the response curve of the static switch shown at the top of Fig. 3, the curve indicated by b shows the response curve of the static switch indicated at the bottom of Fig. 3 whereas the curve c shows the sum of the potentials represented by curves a and b and which will therefore be present between terminals 11 and 14 in Fig. 3.

It will be seen that if the potential Vp were at a point 2 v. negative with respect to potential X, there would be equal potentials at the electric midpoints of windings 3—4 and 7—8. Reference to Fig. 2 will show that in this case the potential created in the secondary winding 11—12 of T₂ is aproximately 8 v. At the same time the difference of potential between the electric midpoints of windings 5—6 and 9—10 would be 4 v. and this potential would be connected in such a manner that the rectifiers inserted between these two windings would be rendered conductive. Reference to Fig. 2 shows that, when the static switch is subjected to a potential of 4 v. in the conductive direction of the rectifiers, the potential Vs is approximately 50 v., and accordingly the curve b in Fig. 5 shows this value at the point of potential X—2 v. The sum of the potentials in windings 11—12 and 13—14 at X—2 v. will accordingly be 58 v. as indicated by curve c. From the figure it is clear that if the potential Vs indicated by curve c were applied to a gaseous discharge tube which required a potential Vb of e. g. 70 v. to cause its ionisation, a sufficient potential Vs would be present only when Vp reaches the value X± approximately 1 v.

An alternative arrangement to obtain the same effect is shown by Fig. 4, which shows the use of a single transformer T₂, instead of the two transformers T₂ and T₃ of Fig. 3. The potential Vp is now connected to the electric midpoint of the winding 7—8 of this transformer, and the potentials X—2 v. and X+2 v., which determine the potential X at which the signal receiver should operate, are connected to the midpoints of winding 3—4 and 5—6 of transformer T₁, respectively. This figure is completed to show the manner in which the secondary winding of transformer T₂ may be connected to the control electrode of a gaseous discharge tube CC, in series with the discharge space of which a signal responding device R is connected.

It will be noticed that when no potential at all is connected to the point marked Vp in Figs. 3 and 4 a direct current will flow from the potential X+2 v. to the potential X—2 v., through both direct current paths of the static switches, in series whereby an alternating current would be transmitted to the transformer T₂, of sufficient potential to cause the functioning of the gaseous discharge tube. In order to obviate this, the point Vp is permanently connected to e. g. a ground potential through a resistance of high value W. This potential is of such value that it is either negative with respect to X—2, or positive with respect to X+2, and thereby prevents direct current flowing through one of the two direct current paths mentioned so that only this static switch passes alternating current potential, and the potential Vb required to produce functioning of the discharge tube cannot be reached. When a potential Vp is connected which should cause the functioning of the gaseous discharge tube, the resistance through which this potential is provided should be low enough to render the effect of the connection of ground through resistance W negligible.

It may be observed from the curves shown in Fig. 5 that the arrangement as shown in Figs. 3 and 4 is capable of functioning correctly only when the maximum potential Vs produced by each individual static switch is substantially less than the minimum potential required to ionise the gaseous discharge tube, whereas at the same time the sum of the potentials produced by each static switch at the operating potential X should exceed the maximum potential Vb required to ionise the discharge tube.

It will be clear, that from Fig. 5 the operating limits obtainable with this arrangement will not be very large, since the potential Vs produced by a single static switch is already relatively near to the ionisation potential Vb. These limits can be somewhat increased by taking instead of the reference potentials X+2 and X—2, other potentials which are farther apart but in each case the "false" potential, produced by one static switch will be more than half the ionisation potential Vb.

Taking the reference potentials farther apart has in itself the consequence that the range of potentials at which the discharge tube will function is increased, so that it is not possible, with this arrangement, to restrict the operation of the system to a sharply defined potential X.

Better results are obtained with the arrangements indicated by Figs. 9 and 10. Considering Fig. 9 first, this differs from Fig. 3 in that the ocnnections to winding 9—10 of transformer T₃ have been reversed. As a consequence, the potentials induced in windings 11—12 and 13—14 of transformers T₂ and T₃, which are connected in series, now counteract each other, so that the total potential Vs will be zero, when the potentials produced by transformers T₂ and T₃ are equal. Besides the electric midpoints of windings 3—4 and 5—6 also the electric midpoints of windings 1—2 and 3—4 are mutually interconnected.

The controlling potential $V_p$ must now be applied to the joint midpoints of both static switches at points 13 and 14.

It will now be seen that when point 13 is positive with respect to point 14, direct current will pass through the static switch comprising windings 5—6 and 8—12, whereas no current will pass through the other static switch, in consequence of which an alternating current will be induced in winding 10—11 of transformer $T_2$ only.

When point 13 is negative with respect to point 14, direct current will pass through the static switch comprising windings 6—7 and 7—8, as a consequence of which alternating current will be induced in winding 11—12 of transformer $T_2$ only. In the case now under consideration, the characteristics of each static switch are represented by the curve shown by Fig. 3 from which it will be seen that a potential $V_s$ exceeding the ionisation potential $V_i$ is already obtained with a difference of potential $V_p$ of less than 2 v.

In Fig. 7 curve $a$ shows the potential produced by transformer $T_2$ when point 13 is positive with respect to point 14, whereas curve $b$ shows the potential produced by transformer $T_2$ when point 13 is negative with respect to point 14. Owing to the fact that windings 11—12 and 10—11 are connected in opposite directions, their potentials will annul each other, when they are equal, which is the case when there is no potential between points 13 and 14, i. e. at potential $H$ in Fig. 7. The sum of the curves $a$ and $b$ referred to by Fig. 7 is represented by Fig. 8. It shows clearly that only at the point $H$ does the potential $V_s$ become zero.

It is well known that the electrical equivalent of the arrangement represented by Fig. 8 is provided by a circuit using a so called "ring" modulator, as is represented in Fig. 10. This figure shows at the same time, how the potential $V_s$ produced in the secondary winding 7—8 of transformer $T_2$ is caused to act on an arrangement of two gaseous discharge tubes $CC_1$ and $CC_2$ in such a manner that the discharge tube $CC_2$ is ionised only when the potential $V_s$ drops below the ionisation potential of the tube $CC_1$. The arrangement of these two discharge tubes is disclosed in the copending U. S. application Serial No. 765,321, which was filed on July 31, 1947.

From the above and from Fig. 8 it will be clear that the tube $CC_2$ will function and cause the operation of the signal responding device R in Fig. 10, when the potentials at points J and K in Fig. 10 are equal or do not differ more than $\pm 1$ v.

It will be seen that with this arrangement very good limits may be obtained for the operation and non-operation of the signal responding device, because the only requirement to be met is that the minimum difference of potential $V_p$ at which the device is required not to function shall be sufficient to produce the potential $V_s$ required to cause the ionisation of the first tube $CC_1$.

It will be noticed that the response curve of the arrangement shown by Fig. 10 is rather sharp and permits the functioning of a signal responding device at a very small range of potentials $V_s$ only.

The arrangement represented by Fig. 13 is an alternative to Fig. 10, which permits the range of potentials at which the signal responding device functions to be extended to any desired width. For this purpose, an arrangement similar to that shown by Fig. 4 is used, except that the connections from the rectifiers shown at the bottom of the drawing are connected to winding 7—8 of transformer $T_2$ in such a manner that the alternating current potential supplied therethrough is opposed to that supplied through the rectifiers at the top. At the same time, the electric midpoint of winding 5—6 is now connected to a potential $H+a$ and that of the winding 7—8 to a potential $H-a$, in which $H$ represents the average of the range potentials on which the signal responding device is required to function, and $a$ is a variable determining the width of this range. In the example shown by Fig. 13, $a$ has been taken as 2 v. In order to better understand the arrangement as illustrated by Figure 13, a brief description of the operation of tubes $CC_1$ and $CC_2$ is as follows:

The winding 9, 10 is connected to a source of direct current designated as B—, and at opposite terminals thereof resistances 14 and 15 are connected to the two cathodes $Ca1$ and $Ca2$ of a gaseous discharge tube of the cold cathode type $CC_1$. It will be evident that if the potential at 9 is equal to the potential at 10 there will be no potential difference between the cathodes $Ca1$ and $Ca2$ and these two electrodes will both be at the potential of the battery B—. By way of example, in order to bring the indicating device to a condition in which it is ready to respond to a signal, a source of variable control voltage is applied to the primary winding 5, 6 of the transformer $T_2$. The potential induced in the secondary winding is now connected to the two cathodes $Ca1$ and $Ca2$. The direction of these potentials is such that if $Ca1$ is becoming more positive, $Ca2$ will become more negative and vice-versa. The ratio of the number of turns between the primary winding and the secondary winding on the transformer is so high that the potential applied between the two cathodes $Ca1$ and $Ca2$ is sufficient to break down the discharge gap between these two electrodes, which causes the discharge to start between either of these electrodes and the anode $An1$. $An1$ is connected through a resistance 16 to ground. The combined effect of the presence of the source of direct current potential and of the variable current potential in the cathode circuits is as follows:

Assume first that no alternating current potential exists between the two cathodes, no discharge will take place from either cathode to the anode because the potential connected across the gaps is insufficient to initiate the discharge. However, when alternating potentials of sufficient magnitude are applied between the cathodes, a discharge is initiated between the two cathodes and this in turn causes discharge to take place between one of the cathodes and the anode. During the period that $Ca1$ becomes more negative and $Ca2$ more positive, the discharge will flow from $Ca1$ to the anode. During the period that $Ca1$ is more negative and $Ca2$ more positive, current will flow from the cathode $Ca2$ to the anode. As a result, a pulsing direct current will flow through the resistance 16. Resistance 16 is shunted by a condenser 17 which will be charged to a potential which may be determined as follows:

Assuming for an instant that the alternating current potential has reached its peak value, the potential between the two cathodes $Ca1$ and $Ca2$ will not have this peak value but will be equal to the sustaining potential of the discharge gap between these two anodes. The difference be-

a voltage in accordance with the algebraic sum of said currents, and means for applying the combined currents to said indicating device to cause said device to operate upon the algebraic sum of the currents exceeding a predetermined value.

2. The device as claimed in claim 1 wherein said indicating device comprises a first gaseous discharge device having a predetermined operating potential, a second gaseous discharge device connected in series with said first discharge device and having a predetermined operating potential different from that of said first discharge device, means for normally maintaining said first discharge device conductive, and means operative when the algebraic sum of the currents passed by said static switches equals a predetermined value for extinguishing said first discharge device and causing said second discharge device to become conductive.

3. The device as claimed in claim 2 and further comprising means controlled by one of said static switches for preventing the operation of said indicating device for all values of said variable control voltage which are positive with respect to said predetermined operating potential of said indicating device and means controlled by said other static switch for preventing operation of said indicating device for all values of said variable control voltage which are negative with respect to the operating potential of said indicating device.

MARTINUS DEN HERTOG.

References Cited in the file of this patent

UNITED STATES PATENTS

| Number | Name | Date |
| --- | --- | --- |
| 1,433,701 | De Forest | Sept. 4, 1923 |
| 1,514,753 | Wold | Nov. 11, 1924 |
| 1,575,761 | Mathews | Mar. 9, 1926 |
| 1,593,993 | Sprague | July 27, 1926 |
| 1,812,117 | Hewlett et al. | Dec. 29, 1926 |
| 2,119,184 | Babler | May 31, 1938 |
| 2,212,332 | Holzler | Aug. 27, 1940 |
| 2,305,845 | Cockerell | Dec. 22, 1942 |
| 2,408,221 | Hornfeck | Aug. 20, 1946 |

FOREIGN PATENTS

| Number | Country | Date |
| --- | --- | --- |
| 39,787 | France | Nov. 24, 1931 |
| 438,339 | Great Britain | Nov. 25, 1935 |
| 457,286 | Great Britain | Nov. 24, 1936 |
| 482,105 | Great Britain | Mar. 23, 1938 |